United States Patent
Zhang

(10) Patent No.: US 10,139,698 B2
(45) Date of Patent: Nov. 27, 2018

(54) ELECTROPHORETIC DISPLAY AND DRIVING METHOD THEREOF

(71) Applicant: BOE TECHNOLOGY GROUP CO., LTD., Beijing (CN)

(72) Inventor: Xiao Zhang, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 101 days.

(21) Appl. No.: 15/504,890

(22) PCT Filed: May 6, 2016

(86) PCT No.: PCT/CN2016/081220
§ 371 (c)(1),
(2) Date: Feb. 17, 2017

(87) PCT Pub. No.: WO2017/133102
PCT Pub. Date: Aug. 10, 2017

(65) Prior Publication Data
US 2018/0107086 A1 Apr. 19, 2018

(30) Foreign Application Priority Data
Feb. 1, 2016 (CN) .......................... 2016 1 0070530

(51) Int. Cl.
*G02F 1/167* (2006.01)
*G09G 3/34* (2006.01)
(Continued)

(52) U.S. Cl.
CPC ........ *G02F 1/167* (2013.01); *G02F 1/133512* (2013.01); *G02F 1/134309* (2013.01);
(Continued)

(58) Field of Classification Search
CPC ............... G02F 1/167; G02F 1/133512; G02F 1/134309; G09G 3/34; G09G 3/344
(Continued)

(56) References Cited

U.S. PATENT DOCUMENTS

| 8,681,414 B2* | 3/2014 | Shin ........................ G02F 1/167 345/107 |
| 2011/0157681 A1* | 6/2011 | Kwon ..................... G02F 1/167 359/296 |
| 2014/0313564 A1 | 10/2014 | Shen et al. |

FOREIGN PATENT DOCUMENTS

| CN | 1914553 A | 2/2007 |
| CN | 102193264 A | 9/2011 |

(Continued)

OTHER PUBLICATIONS

First Chinese Office Action dated Dec. 29, 2016; Appln. No. 201610070530.2.
(Continued)

*Primary Examiner* — Fred Tzeng
(74) *Attorney, Agent, or Firm* — Ladas & Parry LLP

(57) ABSTRACT

An electrophoretic display (EPD) and a driving method thereof. The electrophoretic display (EPD) includes: an upper substrate and a lower substrate arranged opposite to each other, and an electrophoretic medium disposed between the upper substrate and the lower substrate; the EPD is provided with a plurality of pixels; each pixel includes at least two sub-pixels; colored charged particles of different colors are disposed in different sub-pixels of each pixel; and a first wall electrode and a second wall electrode are respectively disposed on two opposite sides of each sub-pixel.

19 Claims, 4 Drawing Sheets

(51) Int. Cl.
*G02F 1/1335* (2006.01)
*G02F 1/1343* (2006.01)

(52) U.S. Cl.
CPC .............. *G09G 3/34* (2013.01); *G09G 3/344* (2013.01); *G02F 2001/1672* (2013.01); *G02F 2001/1676* (2013.01); *G02F 2203/58* (2013.01); *G02F 2203/66* (2013.01); *G09G 2340/08* (2013.01)

(58) Field of Classification Search
USPC ....................................................... 345/107
See application file for complete search history.

(56) References Cited

FOREIGN PATENT DOCUMENTS

| | | |
|---|---|---|
| CN | 102338961 A | 2/2012 |
| CN | 102854691 A | 1/2013 |
| CN | 104007595 A | 8/2014 |

OTHER PUBLICATIONS

International Search Report and Written Opinion dated Sep. 18, 2016; PCT/CN2016/081220.
The Second Chinese Office Action dated Jul. 4, 2017; Appln. No. 201610070530.2.

\* cited by examiner

US 10,139,698 B2

ELECTROPHORETIC DISPLAY AND DRIVING METHOD THEREOF

TECHNICAL FIELD

The present disclosure relates to an electrophoretic display (EPD) and a driving method thereof.

BACKGROUND

An EPD is a display device which achieves display by controlling the distribution of charged particles via electrical field and changing the reflection effect of the charged particles upon ambient light. Because the EPD can achieve display by directly utilizing the ambient light and does not require a backlight module, the power consumption is low, so that the EPD receives more and more extensive attention.

SUMMARY

Embodiments of the present disclosure provide an EPD and a driving method thereof, which are used for achieving color display.

The electrophoretic display (EPD) comprises: an upper substrate and a lower substrate arranged opposite to each other, and an electrophoretic medium disposed between the upper substrate and the lower substrate; the EPD is provided with a plurality of pixels; each pixel includes at least two sub-pixels; colored charged particles of different colors are disposed in different sub-pixels of each pixel; and a first wall electrode and a second wall electrode are respectively disposed on two opposite sides of each sub-pixel.

In addition, an embodiment of the present disclosure provides a method for driving the above-mentioned electrophoretic display (EPD).

The driving method comprises: controlling an electrical field generated between the first wall electrode and the second wall electrode of each sub-pixel, so that the colored charged particles in the sub-pixel can be migrated towards the first wall electrode or the second wall electrode, and hence an amount of light reflected by the colored charged particles in a corresponding sub-pixel can be controlled.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

REFERENCE NUMERALS OF THE ACCOMPANYING DRAWINGS

1—upper substrate 11—shielding structure; 42'—black charged particle in the prior art; 2—lower substrate; 22—light absorbing layer; 3'—electrophoretic medium in the prior art; 3—electrophoretic medium 41—red charged particle; 11'—first electrode in the prior art; 4—colored charged particle; 5—first wall electrode; 4'—charged particle in the prior art; 7—retaining wall; 8—black charged particle; 1'—upper substrate in the prior art; 43—blue charged particle; 6—second wall electrode 21'—second electrode in the prior art; 21—base substrate; 42—green charged particle; 41'—black charged particle in the prior art; 2'—lower substrate in the prior art.

DETAILED DESCRIPTION

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Figure 1:
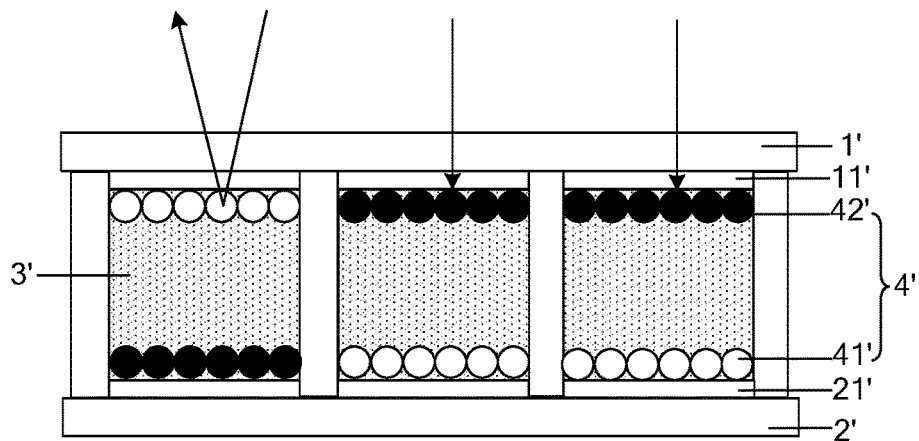
FIG. 1 is a sectional view of an EPD.

FIG. 1 illustrates an EPD, which comprises an upper substrate 1' and a lower substrate 2' arranged opposite to each other, and an electrophoretic medium 3' disposed between the upper substrate 1' and the lower substrate 2'. First electrodes 11' are disposed on the upper substrate 1'; second electrodes 21' are disposed on the lower substrate 2; the EPD is divided into a plurality of pixels; each pixel is provided with charged particles 4; the charged particles 4' include a plurality of white charged particles 41' and a plurality of black charged particles 42; and charges of the white charged particles 41' and charges of the black charged particles 42' are of different types, so that the direction of the electrical fields between the first electrodes 11' and the second electrodes 21' of the pixel can be changed, namely whether the pixel displays white or black can be changed. The EPD as illustrated in FIG. 1 can only achieve black display and white display and cannot achieve color display, and hence is unfavorable for the wide application of the EPD.

Embodiments of the present disclosure provide an EPD and a driving method thereof, which are used for achieving color display.

The EPD comprises an upper substrate and a lower substrate arranged opposite to each other, and an electrophoretic medium disposed between the upper substrate and the lower substrate. The EPD is provided with a plurality of pixels, each pixel includes at least two sub-pixels; colored charged particles of different colors are disposed in different sub-pixels of each pixel; and a first wall electrode and a second wall electrode are respectively disposed on two opposite sides of each sub-pixel.

An embodiment of the present disclosure provides the foregoing EPD. Each pixel in the EPD includes at least two sub-pixels, the colored charged particles of different colors are disposed in different sub-pixels of each pixel, and the first wall electrode and the second wall electrode are respectively disposed on the two opposite sides of each sub-pixel so as to isolate the sub-pixels, thus, by controlling the direction and magnitude of the electrical field generated between the first wall electrode and the second wall electrode of each sub-pixel, the migration of the colored charged particles in the sub-pixel towards the first wall electrode or the second wall electrode can be controlled, the amount of migration of the colored charged particles can be controlled, the amount of light reflected by the colored charged particles in each sub-pixel can be controlled, and the color displayed by each pixel can be controlled, and hence the EPD can achieve color display.

In addition, an embodiment of the present disclosure further provides a method for driving an EPD. The driving method is used for driving the foregoing EPD.

The driving method comprises: controlling the electrical field generated between the first wall electrode and the second wall electrode of each sub-pixel, so that the colored charged particles in the sub-pixel can be migrated towards the first wall electrode or the second wall electrode, and hence the amount of light reflected by the colored charged particles in corresponding sub-pixel can be controlled.

An embodiment of the present disclosure provides a driving method of the foregoing EPD. In the driving method, by controlling the direction and magnitude of the electrical field generated between the first wall electrode and the second wall electrode of each sub-pixel, the migration of the colored charged particles in the sub-pixel towards the first wall electrode or the second wall electrode can be controlled; the amount of migration of the colored charged particles can be controlled; the amount of light reflected by the colored charged particles in each sub-pixel can be controlled; the color displayed by each pixel can be controlled; and hence the EPD can achieve color display.

First Embodiment

Figure 2:
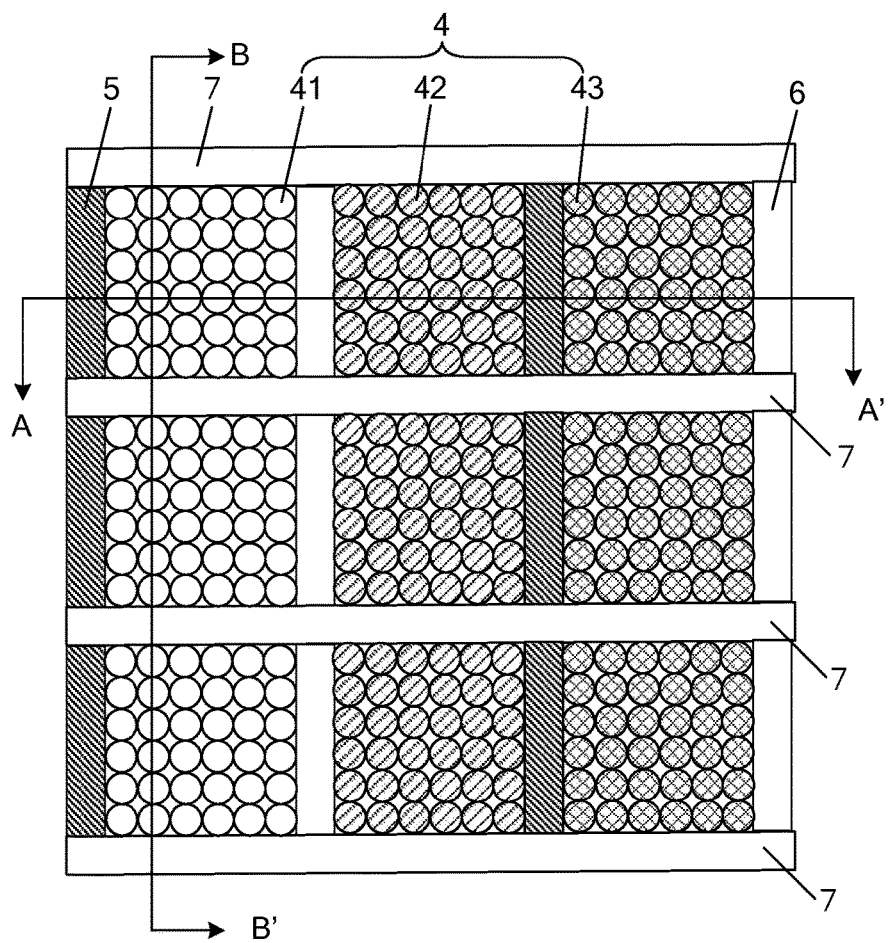
FIG. 2 is a plan view of a first EPD provided by a first embodiment of the present disclosure.
Figure 3:
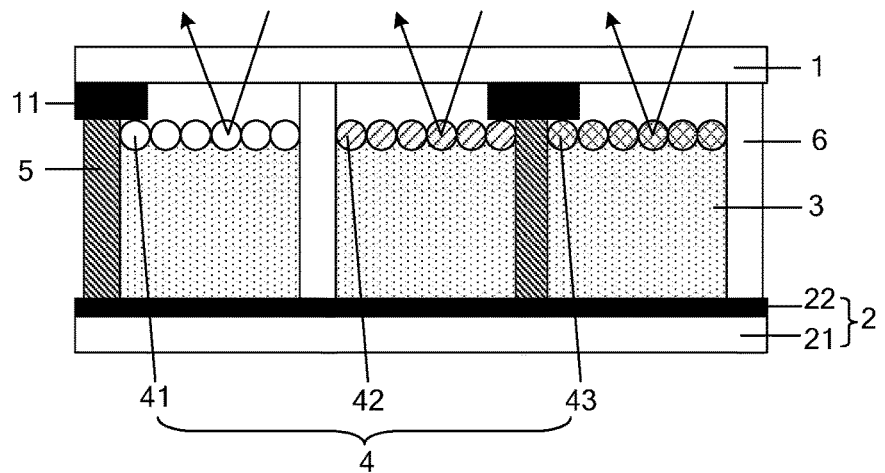
FIG. 3 is a sectional view of FIG. 2 in direction AA'.

The first embodiment provides an EPD. As illustrated in FIGS. 2 and 3, the EPD comprises an upper substrate 1 and a lower substrate 2 arranged opposite to each other, and an electrophoretic medium 3 disposed between the upper substrate 1 and the lower substrate 2. Specifically, the EPD is divided into a plurality of pixels; each pixel includes at least two sub-pixels; colored charged particles of different colors are disposed in different sub-pixels of each pixel; and a first wall electrode 5 and a second wall electrode 6 are respectively disposed on two opposite sides of each sub-pixel so as to isolate the sub-pixels.

In addition, for instance, as illustrated in FIG. 3, in the first embodiment of the present disclosure, both ends of each first wall electrode 5 respectively make contact with the upper substrate 1 and the lower substrate 2, and both ends of each second wall electrode 6 also respectively make contact with the upper substrate 1 and the lower substrate 2, so that the electrical field between the first wall electrode 5 and the second wall electrode 6 can have good controllability on the colored charged particles 4.

The embodiment of the present disclosure provides the foregoing EPD. Each pixel in the EPD includes at least two sub-pixels; the colored charged particles 4 of different colors are disposed in different sub-pixels of each pixel; and the first wall electrode 5 and the second wall electrode 6 are respectively disposed on the two opposite sides of each sub-pixel so as to isolate the sub-pixels. Thus, by controlling the direction and magnitude of the electrical field generated between the first wall electrode 5 and the second wall electrode 6 of each sub-pixel, the migration of the colored charged particles 4 in the sub-pixel towards the first wall electrode 5 or the second wall electrode 6 can be controlled; the amount of migration of the colored charged particles 4 can be controlled; the amount of light reflected by the colored charged particles 4 in each sub-pixel can be controlled; the color displayed by each pixel can be controlled; and hence the EPD can achieve color display.

It should be noted that the expression that "the first wall electrode 5 and the second wall electrode 6 are respectively disposed on the two opposite sides of each sub-pixel so as to isolate the sub-pixels" does not define whether there are other structures between two adjacent sub-pixels so as to isolate the sub-pixels, and also does not define structures disposed on the other two opposite sides of each sub-pixel. The specific implementation for isolating the sub-pixels may be of various kinds. Illustratively, the embodiment of the present disclosure provides the following two specific implementations.

Figure 4:
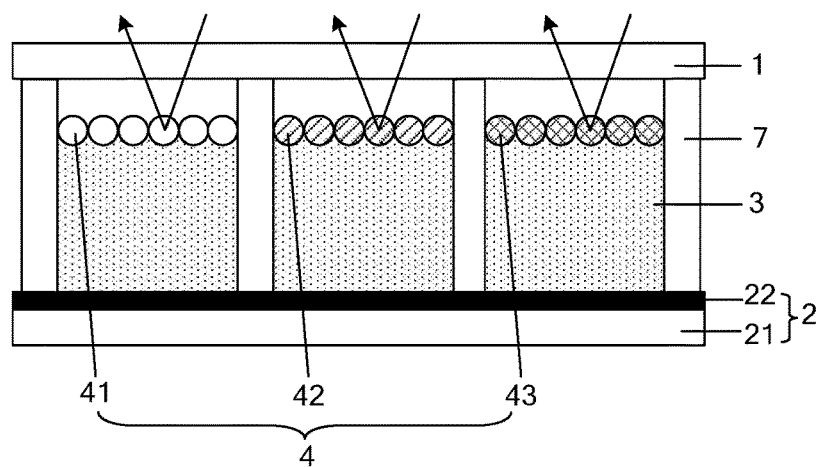
FIG. 4 is a sectional view of FIG. 2 in direction BB'.

First specific implementation: when both ends of each first wall electrode 5 respectively make contact with the upper substrate 1 and the lower substrate 2 and both ends of each second wall electrode 6 also respectively make contact with the upper substrate 1 and the lower substrate 2, as illustrated in FIG. 3 (a sectional view of FIG. 2 along direction AA'), only the first wall electrode 5 or the second wall electrode 6 is disposed between two adjacent sub-pixels, namely the sub-pixels may be isolated from each other in the direction. At this point, as illustrated in FIG. 3, the first wall electrodes 5 and the second wall electrodes 6 are alternately arranged. As illustrated in FIG. 4 (a sectional view of FIG. 2 along direction BB'), a retaining wall 7 is respectively disposed on the other two opposite sides of each sub-pixel so as to isolate the sub-pixels in the direction. At this point, two adjacent sub-pixels share one first wall electrode 5 or one second wall electrode 6. Thus, the quantity of structure components between the sub-pixels is small; the thickness of the structures between the sub-pixels is small; the structure and the driving method of the EPD is simplified; the cost of the EPD is low; and the aperture ratio of the EPD is increased.

Figure 5:
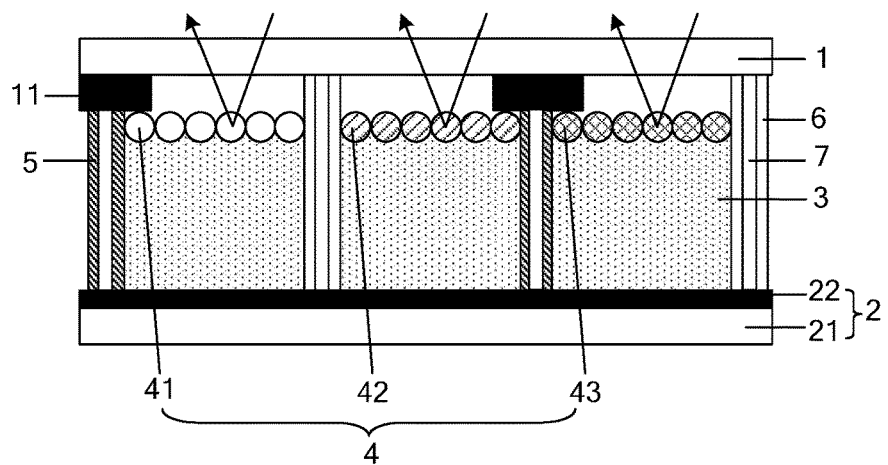
FIG. 5 is a sectional view of a second EPD provided by the first embodiment of the present disclosure.

Second specific implementation: four retaining walls 7 are disposed on the periphery of each sub-pixel; a closed rectangular frame is encircled by the four retaining walls 7. As illustrated in FIG. 5, the first wall electrode 5 or the second wall electrode 6 is respectively disposed on both sides of the retaining wall 7 between two adjacent sub-pixels; the retaining wall 7 and the wall electrodes (the collective name of the first wall electrode 5 and the second wall electrode 6) on both sides thereof are configured to together isolate the sub-pixels in the direction; the retaining walls 7 are respectively disposed on the other two opposite sides of each sub-pixel so as to isolate the sub-pixels in that direction; and the sectional view in the direction may refer to FIG. 4 in the first specific implementation.

In addition, in the embodiment of the present disclosure, the first wall electrodes 5 may be formed on the upper substrate 1 and the second wall electrodes 6 may be formed on the lower substrate 2; or one part of the first wall electrodes 5 and one part of the second wall electrodes 6 are formed on the upper substrate and the other part of the first wall electrodes 5 and the other part of the second wall electrodes 6 are formed on the lower substrate 2; or both the first wall electrodes 5 and the second wall electrodes 6 are formed on the same substrate, e.g., the upper substrate 1 or the lower substrate 2. When both the first wall electrodes 5 and the second wall electrodes 6 are formed on the same substrate (the upper substrate 1 or the lower substrate 2), the manufacturing method of the first wall electrodes 5 and the second wall electrodes 6 is simple, so that the manufacturing method of the EPD can be simplified. In the manufacturing process of the first wall electrodes 5 and the second wall electrodes 6, an electrode layer may be formed by sputtering on the upper substrate 1 or the lower substrate 2 at first, and subsequently, the electrode layer is patterned to form the pattern including the first wall electrodes 5 and the second wall electrodes 6. Illustratively, the material of the first wall electrodes 5 and the second wall electrodes 6 may be a metal or transparent conductive material (e.g., indium tin oxide (ITO)).

Optionally, as illustrated in FIG. 3, the EPD provided by the embodiment of the present disclosure further comprises a shielding structure 11 disposed on the upper substrate 1. The position of the shielding structure corresponds to the position of the first wall electrode 5 and/or the second wall electrode 6. The shielding structure 11 is configured to shield the colored charged particles 4 migrated to the first wall electrode 5 or the second wall electrode 6, so as to prevent light reflected by this part of colored charged particles 4 from entering the human eyes, and hence the display effect of the EPD can be guaranteed. The expression that "the position of the shielding structure 11 corresponds to the position of the first wall electrode 5 and/or the second wall electrode 6" refers to that a projection of the shielding structure 11 on the lower substrate and a projection of the first wall electrode 5 and/or the second wall electrode 6 on the lower substrate have an overlap section therebetween. If the charges of all the colored charged particles are of the same type, the shielding structures 11 may be only disposed at positions corresponding to the first wall electrodes 5 or the second wall electrodes 6, so that the structure of the EPD can be simplified. At this point, the driving method of the EPD needs to match with the structure. For instance, the shielding structures 11 are only disposed at positions of the upper substrate 1 corresponding to the first wall electrodes 5. When all the colored charged particles 4 are positively charged, in the display process of the EPD, a low voltage can be applied to the first wall electrodes 5 and a high voltage can be applied to the second wall electrodes 6, so that the colored charged particles 4 are migrated towards the first wall electrodes 5, and hence the colored charged particles 4 migrated to the first wall electrodes 5 are shielded. When the charges of the colored charged particles 4 in all the sub-pixels are of different types, or when the shielding structures 11 are only disposed at positions of the upper substrate 1 corresponding to the second wall electrodes 6, the driving method of the EPD may be correspondingly selected by those skilled in the art according to the above content. No further redundant description will be given here.

The shielding structure 11 may be a black film or a white film; because the white film can reflect light, the display effect of the EPD can be affected to a certain degree. Thus, for instance, in an embodiment of the present disclosure, the shielding structure 11 may be a black film. Moreover, for instance, the shielding structure 11 is a black resin layer with a low cost and a simple manufacturing process.

Detailed description will be given below to the upper substrate 1, the lower substrate 2, the electrophoretic medium 3 and the colored charged particles 4 in the EPD provided by an embodiment of the present disclosure.

Optionally, the upper substrate 1 provided by the embodiment of the present disclosure may be a transparent glass substrate or a quartz substrate. The lower substrate 2 may be a transparent substrate or a quartz substrate. At this point, light irradiated to the lower substrate can run through the lower substrate 2. As illustrated in FIG. 3, the lower substrate 2 may also include a base substrate 21 and a light absorbing layer 22 disposed on the base substrate 21. At this point, the lower substrate 2 may absorb light irradiated to the lower substrate. The base substrate 21 may be a transparent glass substrate or a quartz substrate. The light absorbing layer 22 may be a black resin layer with a low cost and a simple manufacturing method.

Optionally, the material of the electrophoretic medium 3 in the embodiment of the present disclosure may be cellulose acetate, agarose gel, polyacrylamide gel, etc.

Optionally, each pixel in the embodiment of the present disclosure includes a red sub-pixel, a green sub-pixel and a blue sub-pixel; the red sub-pixel is provided with red charged particles 41; the green sub-pixel is provided with green charged particles 42; and the blue sub-pixel is provided with blue charged particles 43. The red charged particles 41, the green charged particles 42 and the blue charged particles 43 may be all charged pigmented polymer particles. The diameter of the pigmented polymer particles may be from 50 nm-1,000 nm, for instance, be from 150 nm-600 nm.

In addition, in the embodiment of the present disclosure, the charges of all the colored charged particles 4 may be of the same type. Or when all the colored charged particles 4 in each sub-pixel carry the same type of charges, the colored charged particles 4 in one part of sub-pixels are positively charged and the colored charged particles 4 in the other part of sub-pixels are negatively charged. No limitation will be given here in the embodiment of the present disclosure. Optionally, the sub-pixel of the EPD may be only provided with the colored charged particles 4 or may be provided with black charged particles 8 as well. Detailed description will be given below to the above two EPDs in the embodiment of the present disclosure.

Optionally, when the sub-pixel is only provided with the colored charged particles 4, the density of the colored charged particles 4 may be less than that of the electrophoretic medium 3. Thus, when there is no electrical field generated between the first wall electrode 5 and the second wall electrode 6 as illustrated in FIG. 3, the colored charged particles 4 are disposed on the electrophoretic medium 3. Therefore, when light is irradiated to and reflected by the colored charged particles 4, the light will not run through the electrophoretic medium 4, so that the light utilization can be high. In addition, the quantity of the colored charged particles 4 must satisfy the following conditions: when there is no electrical field generated between the first wall electrode 5 and the second wall electrode 6, the colored charged particles 4 at least cover the electrophoretic medium 3. Thus, when the EPD displays white, all the light can be reflected by the colored charged particles 4 and no light is irradiated to the lower substrate 1. Thus, the light utilization is high, and hence the EPD can have higher brightness when displaying white.

Detailed description will be given below on how to achieve color display in the EPD with the above structure by taking the following as an example: all the colored charged particles 4 carry the same type of charges; each pixel includes a red sub-pixel, a green sub-pixel and a blue sub-pixel; the red sub-pixel is provided with red charged particles 41; the green sub-pixel is provided with green charged particles 42; and the blue sub-pixel being provided with blue charged particles 43.

If there is no electrical field generated between all the first wall electrodes 5 and all the second wall electrodes 6 (this status may be achieved by not applying voltage or applying same voltage to both), as illustrated in FIGS. 3 and 5, all the colored charged particles 4 are disposed on the electrophoretic medium 3 and can reflect light. At this point, the amount of light reflected by the colored charged particles in the sub-pixels of each pixel is same, so that all the pixels can display white, and hence the EPD can display white.

Figure 6:
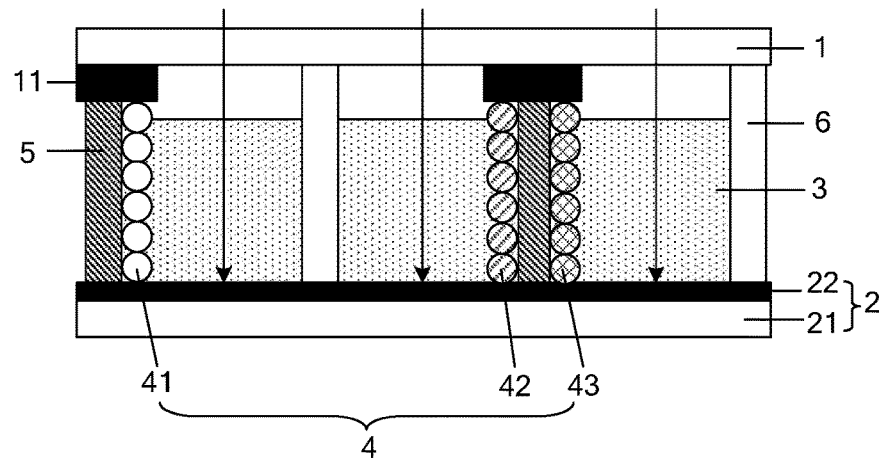
FIG. 6 is a sectional view 1 of the first EPD provided by the first embodiment of the present disclosure.

If the electrical fields generated between all the first wall electrodes 5 and all the second wall electrodes 6 are greater than or equal to a critical value, as illustrated in FIG. 6, all the colored charged particles 4 are migrated to the first wall electrodes 5 or the second wall electrodes 6, and the colored charged particles 4 cannot reflect light, so that light can be irradiated to the lower substrate 2. At this point, the display effect of the EPD depends on the lower substrate 2. If, as illustrated in FIG. 6, the lower substrate 2 includes a transparent base substrate 21 and a light absorbing layer disposed on the base substrate 21, the lower substrate 2 can absorb the light, so that the EPD can display black; and if the lower substrate 2 is transparent, the EPD is in a transparent state.

Figure 7:
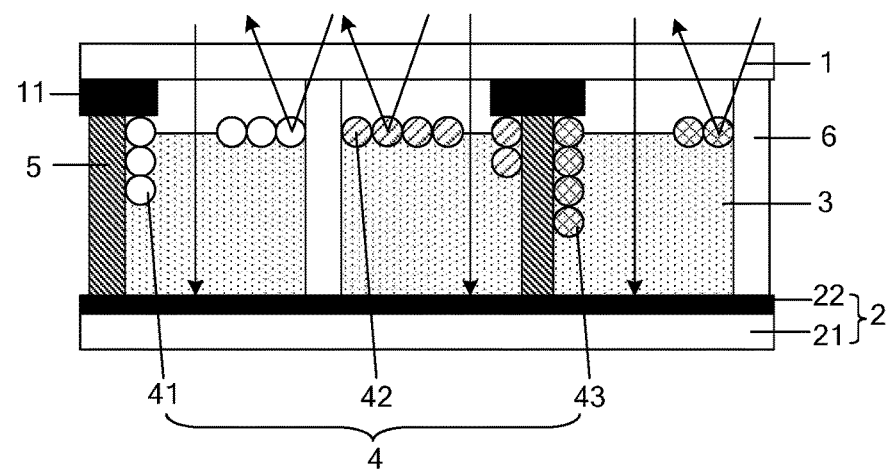
FIG. 7 is a sectional view 2 of the first EPD provided by the first embodiment of the present disclosure.

If the electrical field between the first wall electrode 5 and the second wall electrode 6 of at least one sub-pixel is greater than 0 and less than the critical value, as illustrated in FIG. 7, partial colored charged particles 4 in the at least one sub-pixel are disposed on the electrophoretic medium 3. As for one pixel, if the same amount of colored charged particles 4 in the three sub-pixels of the pixel are disposed on the electrophoretic medium 3, the pixel displays white; and if the amount of the colored charged particles 4 disposed on the electrophoretic medium 3 in the three sub-pixels of the pixel is not completely the same, the pixel achieves color display. When all the pixels display white, the EPD displays white; and when at least one pixel achieves color display, the EPD achieves color display. The amount of light reflected by the colored charged particles 4 in the sub-pixels may be adjusted by adjusting the magnitudes of the electrical fields between the first wall electrodes 5 and the second wall electrodes 6 of the sub-pixels within a range of greater than 0 and less than the critical value, so that the pixels can display different colors.

The critical value is the magnitude of the electrical field when all the colored charged particles 4 are just migrated to the first wall electrode 5 or the second wall electrode 6 and may be set according to the electricity quantity of the colored charged particles 4, the quantity of the colored charged particles 4, the size of the sub-pixel, and other factors. No limitation will be given here. In addition, description is given above to the means of achieving color display in the EPD by only taking the EPD with specific structure as an example. The means of achieving color display when the EPD has other specific structures can be obtained by those skilled in the art on the basis of the above content. No further description will be given here.

Figure 8:
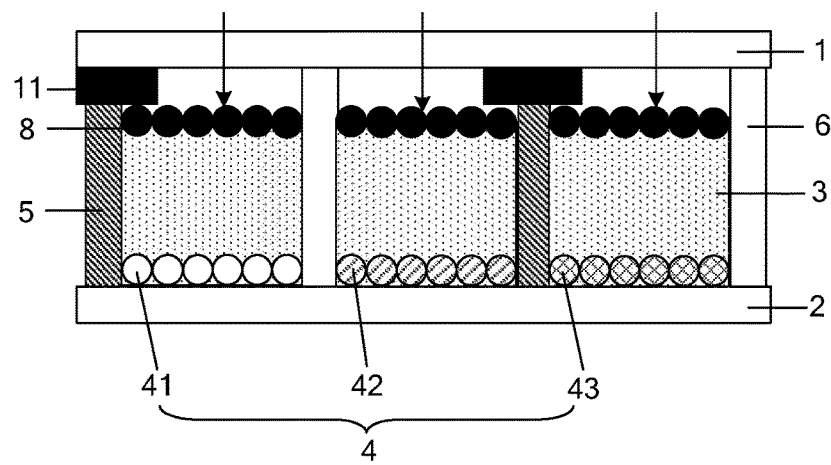
FIG. 8 is a sectional view 1 of a third EPD provided by the first embodiment of the present disclosure.

Optionally, as illustrated in FIG. 8, when each sub-pixel is not only provided with the colored charged particles 4 but also provided with the black charged particles 8, charges of the black charged particles 8 and charges of the colored charged particles 4 are of different types; the density of the colored charged particles 4 is greater than that of the electrophoretic medium 3; and the density of the black charged particles 8 is less than that of the electrophoretic medium 3. For instance, in the embodiment of the present disclosure, in the same electrical field, the migration rate of the black charged particles 8 is greater than that of the colored charged particles 4, so that all the black charged particles 5 can be disposed on the first wall electrode 5 or the second wall electrode 6 when the electrical field between the first wall electrode 5 and the second wall electrode 6 reaches a certain value. At this point, the colored charged particles 4 disposed beneath the electrophoretic medium 3 will not be shielded by the black charged particles 5 and can all be configured to reflect light, so that the light utilization can be high. Optionally, as known from the acceleration formula $a=qE/m$ of the charged particles in the electrical field, the migration rate of the black charged particles 8 can be greater than that of the colored charged particles 4 in the same electrical field by adoption of the means that the mass of the black charged particles 8 is less than that of the colored charged particles (if the black charged particles 8 and the colored charged particles 4 are made from a same material, the diameter of the black charged particles 8 is less than that of the colored charged particles 4) and/or the means that the electricity quantity of the black charged particles 8 is greater than that of the colored charged particles 4.

In addition, the quantity of the colored charged particles 4 satisfies the following condition: when there is no electrical field between the first wall electrode 5 and the second wall electrode 6, the colored charged particles 4 cover a lower surface of the electrophoretic medium 3, so that the brightness can be higher when the EPD achieves color display or displays white; and the quantity of the black charged particles 8 also satisfies the following condition: when there is no electrical field between the first wall electrode 5 and the second wall electrode 6, the black charged particles 8 cover the lower surface of the electrophoretic medium 3, so that light of other colors cannot be blended in when the EPD displays black.

Detailed description will be given below on how to achieve color display in the EPD with the above structure by taking the following as an example: all the colored charged particles 4 carry the same type of charges; all the black charged particles 8 carry another type of charges; each pixel includes a red sub-pixel, a green sub-pixel and a blue sub-pixel; the red sub-pixel is provided with red charged particles 41; the green sub-pixel is provided with green charged particles 42; and the blue sub-pixel is provided with blue charged particles 43.

If there is no electrical field between all the first wall electrodes 5 and all the second wall electrodes 6, as illustrated in FIG. 8, all the black charged particles 8 are disposed on the electrophoretic medium 3 and all the colored charged particles 4 are disposed beneath the electrophoretic medium 3, so that all the colored charged particles 4 can be shielded by the black charged particles 8, and hence the EPD can display black.

Figure 9:
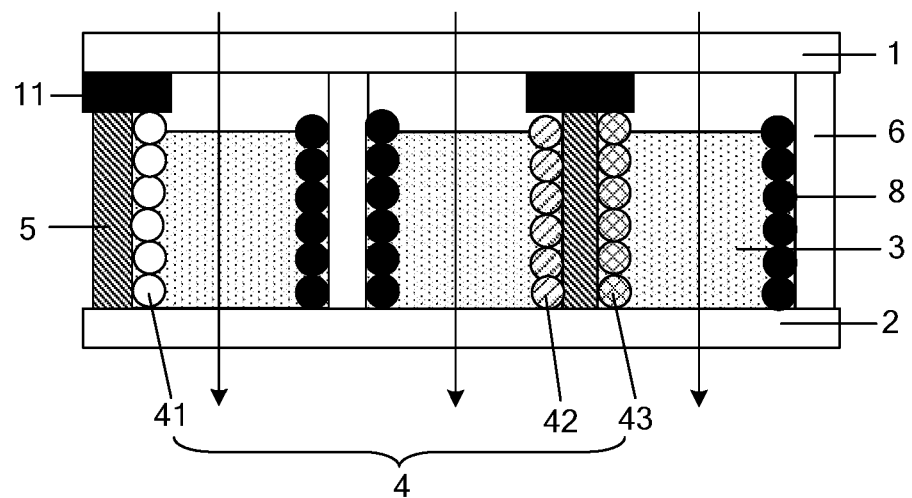
FIG. 9 is a sectional view 2 of the third EPD provided by the first embodiment of the present disclosure.

If the electrical fields between all the first wall electrodes 5 and all the second wall electrodes 6 is greater than the critical value, as illustrated in FIG. 9, all the colored charged particles 4 and all the black charged particles 8 are respectively disposed on the first wall electrodes 5 and the second wall electrodes 6, so that the display effect of the EPD depends on the structure of the lower substrate 2. If, as illustrated in FIG. 9, the lower substrate 2 includes a transparent base substrate 21 and a light absorbing layer disposed on the base substrate 21, the lower substrate 2 can absorb light, and hence the EPD can display black; and if the lower substrate 2 is transparent, the EPD is in a transparent state.

If the electrical field between the first wall electrode 5 and the second wall electrode 6 of at least one sub-pixel is greater than 0 and less than the critical value, as illustrated in HG. 10, partial colored charged particles 4 in the at least one sub-pixel are not shielded by the black charged particles 8 and can reflect light. As for one pixel, if the same amount of colored charged particles 4 in the three sub-pixels of the pixel can reflect light, the pixel displays white; and if the amount of the colored charged particles 4 capable of reflecting light in the three sub-pixels of the pixel is not completely the same, the pixel achieves color display. When all the pixels display white, the EPD displays white; and when at least one pixel achieves color display, the EPD achieves color display. The amount of light reflected by the colored charged particles 4 in the sub-pixels may be adjusted by adjusting the magnitude of the electrical field between the first wall electrodes 5 and the second wall electrodes 6 of the sub-pixels within a range of greater than 0 and less than the critical value, so that the pixels can display different colors.

The critical value is the magnitude of the electrical field when all the colored charged particles 4 are just migrated to the first wall electrode 5 or the second wall electrode 6 and may be set according to the electricity quantity of the colored charged particles 4, the quantity of the colored charged particles 4, the size of the sub-pixel, and other factors. No limitation will be given here.

Second Embodiment

This embodiment of the present disclosure provides a method for driving an EPD. The driving method is used for driving the EPD provided by the first embodiment. Specifically, as illustrated in FIG. 3, the EPD comprises an upper substrate 1 and a lower substrate 2 arranged opposite to each other, and an electrophoretic medium 3 disposed between the upper substrate 1 and the lower substrate 2. The EPD is divided into a plurality of pixels; each pixel includes at least two sub-pixels; colored charged particles 4 of different colors are disposed in different sub-pixels of each pixel; and a first wall electrode 5 and a second wall electrode 6 are respectively disposed on two opposite sides of each sub-pixel so as to isolate the sub-pixels. The driving method comprises: controlling the electrical field between the first wall electrode 5 and the second wall electrode 6 of each sub-pixel, so that the colored charged particles 4 in the sub-pixel can be migrated towards the first wall electrode 5 or the second wall electrode 6, and hence the amount of light reflected by the colored charged particles 4 in corresponding sub-pixel can be controlled.

The embodiment of the present disclosure provides a driving method of the foregoing EPD. In the driving method, by controlling the direction and magnitude of the electrical field between the first wall electrode 5 and the second wall electrode 6 of each sub-pixel, the migration of the colored charged particles 4 in the sub-pixel towards the first wall electrode 5 or the second wall electrode 6 can be controlled; the amount of migration of the colored charged particles can be controlled; the amount of light reflected by the colored charged particles 4 in each sub-pixel can be controlled; the color displayed by each pixel can be controlled; and hence the EPD can achieve color display.

The step of controlling the electrical field between the first wall electrode 5 and the second wall electrode 6 of each sub-pixel specifically includes: applying the same reference voltage to all the second wall electrodes 6, and meanwhile, applying a respective corresponding display voltage to each first wall electrode 5. Moreover, the quantity of the colored charged particles 4 disposed on the electrophoretic medium 3 in the sub-pixel may be adjusted by adjusting the specific difference between the reference voltage and the display voltage applied to the first wall electrode 5 of the sub-pixel, and hence the amount of light reflected by the colored charged particles 4 in the sub-pixel can be adjusted.

It should be noted that: as known from the description in the first embodiment, the specific structure of the EPD may be various, and the specific steps of the driving method corresponding to the EPD may also be different. Illustratively, when the shielding structures 11 are only disposed on the upper substrate 1 at positions corresponding to the first wall electrodes 5 as illustrated in FIG. 3, the magnitude relationship (whether the value is large or small is embodied here, and the specific difference is not embodied) between the display voltage applied to the first wall electrode 5 of the sub-pixel and the reference voltage applied to the second wall electrode 6 shall be reasonably set. When there is an electrical field generated between the first wall electrode 5 and the second wall electrode 6 of the sub-pixel, the colored charged particles 4 in the sub-pixel can all be migrated towards the first wall electrode 5 and hence be shielded by the corresponding shielding structure 11. The magnitude relationship is relevant to the type of charges of the colored charged particles 4 in the sub-pixel. Illustratively, when all the colored charged particles 4 are positively charged, the display voltage applied to the first wall electrodes 5 of the sub-pixels may be all less than the reference voltage; and when all the colored charged particles 4 are negatively charged, the display voltage applied to the first wall electrodes 5 of the sub-pixels may be all greater than the reference voltage. Thus, when there is an electrical field between the first wall electrode 5 and the second wall electrode 6, the colored charged particles 4 can be migrated towards the first wall electrode 5 and hence be shielded by the shielding structure 11.

For more clear understanding of the present disclosure by those skilled in the art, detailed description will be given below on how to achieve color display in the EPDs with different structures by taking the following case as an example: all the colored charged particles 4 carry the same type of charges; each pixel include a red sub-pixel, a green sub-pixel and a blue sub-pixel; the red sub-pixel is provided with red charged particles 41; the green sub-pixel is provided with green charged particles 42; and the blue sub-pixel is provided with blue charged particles 43.

Illustratively, the sub-pixel in the first EPD is only provided with the colored charged particles 4, and the density of the colored charged particles 4 is less than that of the electrophoretic medium 3. The means of achieving color display in the EPD is as follows:

If there is no electrical field between all the first wall electrodes 5 and all the second wall electrodes 6 (which case may be achieved by not applying voltage or applying same voltage to both), as illustrated in FIGS. 3 and 5, all the colored charged particles 4 are disposed on the electrophoretic medium 3 and can all reflect light. At this point, the amount of light reflected by the colored charged particles in the sub-pixels of each pixel is same, so that all the pixels display white, and hence the EPD displays white.

If the electrical fields between all the first wall electrodes 5 and all the second wall electrodes 6 is greater than or equal to a critical value, as illustrated in FIG. 6, all the colored charged particles 4 are migrated to the first wall electrodes 5 or the second wall electrodes 6, and the colored charged particles 4 cannot reflect light, so that the light can be irradiated to the lower substrate 2. At this point, the display effect of the EPD depends on the lower substrate 2. If, as illustrated in FIG. 6, the lower substrate 2 includes a transparent base substrate 21 and a light absorbing layer disposed on the base substrate 21, the lower substrate 2 can absorb light, so that the EPD can display black; and if the lower substrate 2 is transparent, the EPD is in a transparent state.

If the electrical field between the first wall electrode 5 and the second wall electrode 6 of at least one sub-pixel is greater than 0 and less than the critical value, as illustrated in FIG. 7, partial colored charged particles 4 in the at least one sub-pixel are disposed on the electrophoretic medium 3. As for one pixel, if the same amount of colored charged particles 4 in the three sub-pixels of the pixel are disposed on the electrophoretic medium 3, the pixel displays white; and if the amount of the colored charged particles 4 disposed on the electrophoretic medium 3 in the three sub-pixels of the pixel is not completely the same, the pixel achieves color display. When all the pixels display white, the EPD displays white; and when at least one pixel achieves color display, the EPD achieves color display. The amount of light reflected by the colored charged particles 4 in the sub-pixels may be adjusted by adjusting the magnitude of the electrical field between the first wall electrodes 5 and the second wall electrodes 6 of the sub-pixels within a range of greater than 0 and less than the critical value, so that the pixels can display different colors.

The critical value is the magnitude of the electrical field when all the colored charged particles 4 are just migrated to the first wall electrode 5 or the second wall electrode 6 and may be set according to the electricity quantity of the colored charged particles 4, the quantity of the colored charged particles 4, the size of the sub-pixel, and other factors. No limitation will be given here. In addition, description is given above to the means of achieving color display in the EPD by only taking the EPD with specific structure as an example. The means of achieving color display when the EPD has other specific structures can be obtained by those skilled in the art on the basis of the above content. No further description will be given here.

Illustratively, the sub-pixel in the second EPD is not only provided with the colored charged particles 4 but also provided with black charged particles 8; charges of the black charged particles 8 and charges of the colored charged particles 4 are of different types; the density of the colored charged particles 4 is greater than that of the electrophoretic medium 3; and the density of the black charged particles 8 is less than that of the electrophoretic medium 3. The means of achieving color display in the EPD is as follows:

If there is no electrical field between all the first wall electrodes 5 and all the second wall electrodes 6, as illustrated in FIG. 8, all the black charged particles 8 are disposed on the electrophoretic medium 3 and all the colored charged particles 4 are disposed beneath the electrophoretic medium 3, so that all the colored charged particles 4 are shielded by the black charged particles 8, and hence the EPD displays black.

If the electrical fields between all the first wall electrodes 5 and all the second wall electrodes 6 is greater than the critical value, as illustrated in FIG. 9, all the colored charged particles 4 and all the black charged particles 8 are respectively disposed on the first wall electrodes 5 and the second wall electrodes 6, so that the display effect of the EPD depends on the structure of the lower substrate 2. If, as illustrated in FIG. 9, the lower substrate 2 includes a transparent base substrate 21 and a light absorbing layer disposed on the base substrate 21, the lower substrate 2 can absorb light, and hence the EPD can display black; and if the lower substrate 2 is transparent, the EPD is in a transparent state.

Figure 10:
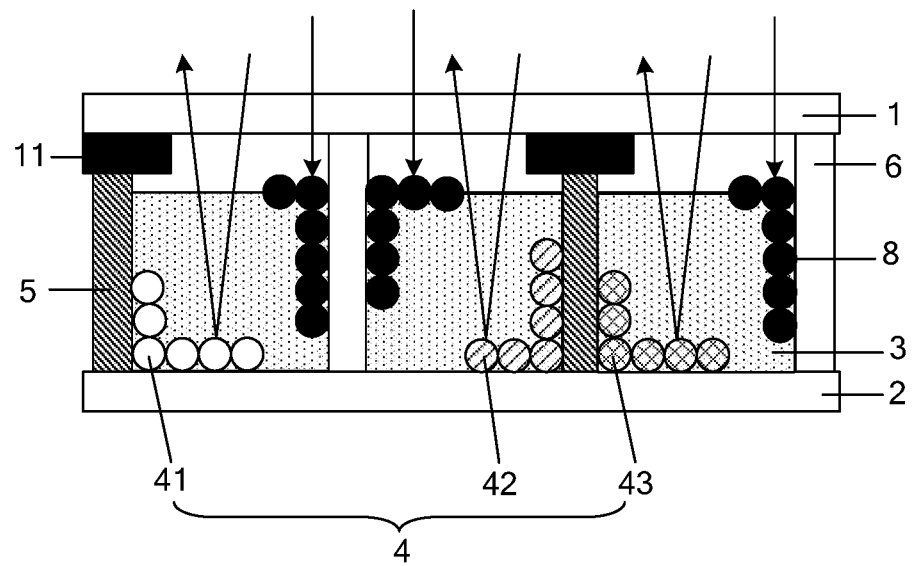
FIG. 10 is a sectional view 3 of the third EPD provided by the first embodiment of the present disclosure.

If the electrical field between the first wall electrode 5 and the second wall electrode 6 of at least one sub-pixel is greater than 0 and less than the critical value, as illustrated in FIG. 10, partial colored charged particles 4 in the at least one sub-pixel are not shielded by the black charged particles 8 and can reflect light. As for one pixel, if the same amount of colored charged particles 4 in the three sub-pixels of the pixel can reflect light, the pixel displays white; and if the amount of the colored charged particles 4 capable of reflecting light in the three sub-pixels of the pixel is not completely the same, the pixel achieves color display. When all the pixels display white, the EPD displays white; and when at least one pixel achieves color display, the EPD achieves color display. The amount of light reflected by the colored charged particles 4 in the sub-pixels may be adjusted by adjusting the magnitude of the electrical field between the first wall electrodes 5 and the second wall electrodes 6 of the sub-pixels within a range of greater than 0 and less than the critical value, so that the pixels can display different colors.

The critical value is the magnitude of the electrical field when all the colored charged particles 4 are just migrated to the first wall electrode 5 or the second wall electrode 6 and may be set according to the electricity quantity of the colored charged particles 4, the quantity of the colored charged particles 4, the size of the sub-pixel, and other factors. No limitation will be given here.

What are described above is related to the illustrative embodiments of the disclosure only and not limitative to the scope of the disclosure; the scopes of the disclosure are defined by the accompanying claims.

The application claims priority to the Chinese patent application No. 201610070530.2, filed Feb. 1, 2016, the entire disclosure of which is incorporated herein by reference as part of the present application.

What is claimed is:

1. An electrophoretic display (EPD), comprising: an upper substrate and a lower substrate arranged opposite to each other, and an electrophoretic medium disposed between the upper substrate and the lower substrate,
   wherein the EPD is provided with a plurality of pixels; each pixel includes at least two sub-pixels; colored charged particles of different colors are disposed in different sub-pixels of each pixel; and a first wall electrode and a second wall electrode are respectively disposed on two opposite sides of each sub-pixel.

2. The EPD according to claim 1, wherein an upper end and a lower end of each first wall electrode respectively make contact with the upper substrate and the lower substrate, and
   an upper end and a lower end of each second wall electrode also respectively make contact with the upper substrate and the lower substrate.

3. The EPD according to claim 1, wherein both the first wall electrode and the second wall electrode are formed on the upper substrate or the lower substrate.

4. The EPD according to claim 1, further comprising a shielding structure disposed on the upper substrate,
   wherein the position of the shielding structure corresponds to the position of the first wall electrode and/or the second wall electrode; and
   the shielding structure is configured to shield the colored charged particles migrated to the first wall electrode or the second wall electrode.

5. The EPD according to claim 4, wherein charges of all the colored charged particles are of a same type; and the shielding structure is only disposed at a position of the upper substrate corresponding to the first wall electrode or the second wall electrode.

6. The EPD according to claim 4, wherein the shielding structure is a black film.

7. The EPD according to claim 1, wherein the sub-pixels are provided with the colored charged particles only; and a density of the colored charged particles is less than that of the electrophoretic medium.

8. The EPD according to claim 7, wherein a quantity of the colored charged particles satisfies: when there is no electrical field between the first wall electrode and the second wall electrode, the colored charged particles cover a surface of the electrophoretic medium.

9. The EPD according to claim 1, wherein each sub-pixel is also provided with black charged particles; charges of the black charged particles and charges of the colored charged particles are of different types; a density of the colored charged particles is greater than that of the electrophoretic medium; and a density of the black charged particles is less than that of the electrophoretic medium.

10. The EPD according to claim 9, wherein in a same electrical field, a migration rate of the black charged particles is greater than that of the colored charged particles.

11. The EPD according to claim 10, wherein a mass of the black charged particles is less than that of the colored charged particles, and/or an electricity quantity of the black charged particles is greater than that of the colored charged particles.

12. The EPD according to claim 9, wherein a quantity of the colored charged particles satisfies: when there is no electrical field between the first wall electrode and the second wall electrode, the colored charged particles cover a lower surface of the electrophoretic medium; and a quantity of the black charged particles satisfies: when there is no electrical field between the first wall electrode and the second wall electrode, the black charged particles cover an upper surface of the electrophoretic medium.

13. The EPD according to claim 1, wherein the lower substrate is a transparent glass substrate or a quartz substrate, or the lower substrate includes a transparent base substrate and a light absorbing layer disposed on the base substrate.

14. The EPD according to claim 1, wherein the sub-pixels are isolated from each other through first wall electrodes and second wall electrodes.

15. A method for driving an electrophoretic display (EPD), wherein the EPD is provided with a plurality of pixels; each pixel includes at least two sub-pixels; colored charged particles of different colors are disposed in different sub-pixels of each sub-pixel; a first wall electrode and a second wall electrode are respectively disposed on two opposite sides of each sub-pixel and configured to isolate the sub-pixels; and the driving method comprises:

controlling an electrical field generated between the first wall electrode and the second wall electrode of each sub-pixel, so that the colored charged particles in the sub-pixel can be migrated towards the first wall electrode or the second wall electrode, and hence an amount of light reflected by the colored charged particles in a corresponding sub-pixel can be controlled.

16. The method for driving the EPD according to claim 15, wherein controlling the electrical field between the first wall electrode and the second wall electrode of each sub-pixel specifically includes:

applying a same reference voltage to all second wall electrodes, and meanwhile, applying a respective corresponding display voltage to each first wall electrode.

17. The method for driving the EPD according to claim 15, wherein the sub-pixels are provided with the colored charged particles only; a density of the colored charged particles is less than that of an electrophoretic medium; and the driving method comprises one or more of following operations:

allowing all first wall electrodes and all second wall electrodes to have no electrical field, so that all the colored charged particles are disposed on the electrophoretic medium, and hence the EPD displays white;

allowing electrical fields between all the first wall electrodes and all the second wall electrodes to be greater than or equal to a critical value, in which all the colored charged particles are disposed on the first wall electrodes or the second wall electrodes; if a lower substrate includes a transparent base substrate and a light absorbing layer disposed on the base substrate, the EPD displays black; if the lower substrate is transparent, the EPD is transparent; and allowing an electrical field between the first wall electrode and the second wall electrode of at least one sub-pixel to be greater than 0 and less than the critical value, so that partial colored charged particles in the at least one sub-pixel are disposed on the electrophoretic medium, and hence the EPD displays white or achieves color display.

18. The method for driving the EPD according to claim 17, wherein the critical value refers to a magnitude of the electrical field when all the colored charged particles are just migrated to the first wall electrode or the second wall electrode.

19. The method for driving the EPD according to claim 15, wherein each sub-pixel is also provided with black charged particles; charges of the black charged particles and charges of the colored charged particles are of different types; a density of the colored charged particles is greater than that of the electrophoretic medium; a density of the black charged particles is less than that of the electrophoretic medium; and the driving method comprises one or more of following operations:

allowing all first wall electrodes and all second wall electrodes to have no electrical field, in which all the black charged particles are disposed on the electrophoretic medium, and all the colored charged particles are disposed beneath the electrophoretic medium; all the colored charged particles are shielded by the black charged particles; the EPD displays black;

allowing electrical fields between all the first wall electrodes and all the second wall electrodes to be greater than or equal to a critical value, in which all the colored charged particles and all the black charged particles are respectively disposed on the first wall electrodes and the second wall electrodes; if a lower substrate includes a transparent base substrate and a light absorbing layer disposed on the base substrate, the EPD displays black; if the lower substrate is transparent, the EPD is transparent; and allowing an electrical field between the first wall electrode and the second wall electrode of at least one sub-pixel to be greater than 0 and less than the critical value, so that partial colored charged particles in the at least one sub-pixel are not shielded by the black charged particles, and hence the EPD displays white or achieves color display.

* * * * *